(12) United States Patent
Knas

(10) Patent No.: US 11,039,275 B1
(45) Date of Patent: Jun. 15, 2021

(54) INTELLIGENT LOCATION-BASED PUZZLE

(71) Applicant: MASSACHUSETTS MUTUAL LIFE INSURANCE COMPANY, Springfield, MA (US)

(72) Inventor: Michal Knas, Monson, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

(21) Appl. No.: 16/741,072

(22) Filed: Jan. 13, 2020

Related U.S. Application Data

(63) Continuation of application No. 16/356,993, filed on Mar. 18, 2019, now Pat. No. 10,536,806, which is a continuation of application No. 15/849,244, filed on Dec. 20, 2017, now Pat. No. 10,313,834.

(60) Provisional application No. 62/437,563, filed on Dec. 21, 2016.

(51) Int. Cl.
*A63F 9/06* (2006.01)
*H04W 4/02* (2018.01)
*H04L 29/08* (2006.01)
*A63F 9/10* (2006.01)

(52) U.S. Cl.
CPC ........... *H04W 4/023* (2013.01); *A63F 9/0612* (2013.01); *H04L 67/10* (2013.01); *H04L 67/18* (2013.01); *A63F 9/10* (2013.01)

(58) Field of Classification Search
CPC ........ H04W 4/023; H04L 67/18; H04L 67/10; A63F 9/0612; A63F 9/10
See application file for complete search history.

(56) References Cited

U.S. PATENT DOCUMENTS

| 10,313,834 B1 | 6/2019 | Knas |
| 10,536,806 B1 | 1/2020 | Knas |
| 2014/0213333 A1* | 7/2014 | Hanes ................. G07F 17/3218 463/9 |
| 2015/0058409 A1* | 2/2015 | Wang ................. H04L 12/2838 709/203 |
| 2017/0180436 A1 | 6/2017 | Strom et al. |
| 2017/0245106 A1* | 8/2017 | Connelly .............. H04L 65/602 |

* cited by examiner

*Primary Examiner* — Said M Elnoubi
(74) *Attorney, Agent, or Firm* — Foley & Lardner LLP

(57) ABSTRACT

Disclosed herein are systems and methods for dynamic generation of an intelligent and location-based puzzle. The method comprises locating a mobile device within a proximity zone associated with an establishment and generating a user dataset comprising a counter representing how many times the user has been identified within the proximity zone. The method further comprises querying, receiving, and displaying a first media element associated with a puzzle. Upon locating the mobile device within the proximity zone for the second time, the method comprises adjusting the counter value and querying, receiving, and displaying a second media element associated with the puzzle.

18 Claims, 5 Drawing Sheets

INTELLIGENT LOCATION-BASED PUZZLE

CROSS-REFERENCE TO RELATED APPLICATIONS

This application is a continuation application of U.S. patent application Ser. No. 16/356,993, filed Mar. 18, 2019, which is a continuation application of U.S. patent application Ser. No. 15/849,244, filed Dec. 20, 2017, which claims priority to U.S. Provisional Patent Application No. 62/437,563, filed Dec. 21, 2016, each of which is hereby incorporated by reference in its entirety for all purposes.

TECHNICAL FIELD

This application relates generally to generating and manipulating datasets associated with mobile device locations.

BACKGROUND

Institutions are constantly trying to attract more customers. As the Internet technology era allows for more efficient interconnectivity between computing systems and mobile devices, many institutions have attempted to provide interesting and attractive material/media elements to potential customer's mobile devices. However, several technological shortcomings have since been identified and have created a new set of technological challenges. For example, many institutions have failed to properly connect with customers' electronic devices in order to transmit timely and relevant material. Furthermore, many institutions have failed to accurately determine whether a potential customer in within the vicinity of the institution. As a result, institutions that utilize existing and conventional technological solutions (e.g., transmitting promotional material to a large pool of potential customers) provide limited and generalized attractive materials based on inaccurate or limited customer information, which can result in negative user experiences.

SUMMARY

For the aforementioned reasons, there is a need for a more accurate system and method, which would allow institutions to accurately locate customers, profile customers in a more efficient manner than possible with human-intervention data-driven analysis, and deliver targeted attractive material to customers' mobile devices. Disclosed herein are systems and methods for dynamic generation of an intelligent and location-based puzzle.

In an embodiment a method comprises detecting, by a server using a beacon, a user device within a proximity zone of the beacon; upon identifying a unique identifier of the beacon used to detect the user device, receiving, by the server, a first set of data transmitted from an application executing on the user device; generating, by the server, a dataset comprising a presence value corresponding to a number of times that the user device has been present within the proximity zone; upon transmitting a first instruction configured to retrieve a first electronic media element corresponding to the presence value and a first piece of a puzzle, retrieving, by the server, the first electronic media element from a database; transmitting, by the server, a second instruction to the application executing on the user device to display the first electronic media element; detecting, by the server using the beacon, the user device within the proximity zone of the beacon; upon identifying the unique identifier of the beacon used to detect the user device, receiving, by the server, a second set of data transmitted from the application executing on the user device; increasing, by the server, the presence value within the dataset; upon transmitting a third instruction to retrieve a second electronic media element corresponding to the increased presence value within the dataset and a second piece of the puzzle, retrieving, by the server, the second electronic media element from the database; and transmitting, by the server, a fourth instruction to the application executing on the user device to display the second electronic media element.

In another embodiment, a computer system comprises a beacon configured to emit location data packets within a first and a second proximity zone; a user device operated by a user configured to receive the data packets from the beacon device and communicate with the beacon device; and a server in communication with the beacon device and the user device, wherein the server is configured to detect, using a beacon, a user device within a proximity zone of the beacon; upon identifying a unique identifier of the beacon used to detect the user device, receive a first set of data transmitted from an application executing on the user device; generate a dataset comprising a presence value corresponding to a number of times that the user device has been present within the proximity zone; upon transmitting a first instruction configured to retrieve a first electronic media element corresponding to the presence value and a first piece of a puzzle, retrieve the first electronic media element from a database; transmit a second instruction to the application executing on the user device to display the first electronic media element; detect, using the beacon, the user device within the proximity zone of the beacon; upon identifying the unique identifier of the beacon used to detect the user device, receive a second set of data transmitted from the application executing on the user device; increase the presence value within the dataset; upon transmitting a third instruction to retrieve a second electronic media element corresponding to the increased presence value within the dataset and a second piece of the puzzle, retrieve the second electronic media element from the database; and transmit a fourth instruction to the application executing on the user device to display the second electronic media element.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1:
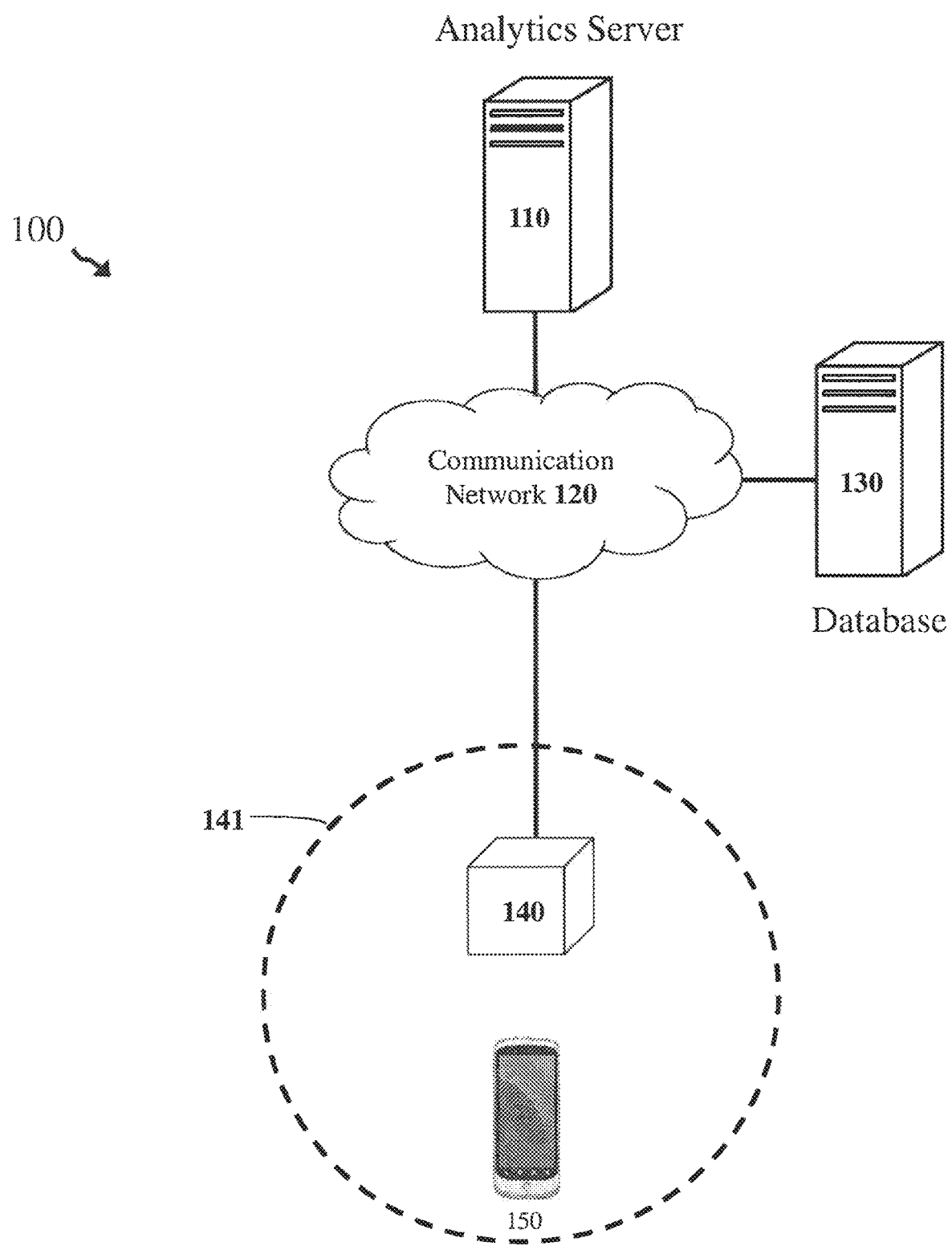
FIG. 1 illustrates an example of a computer system for generating an intelligent location-based puzzle, according to an embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

FIG. 1 illustrates components of a system 100, according to an exemplary embodiment. The system 100 comprises an analytics server 110, a communication network 120, a database 130, a beacon 140, and a mobile device 150. The analytics server 110 may communicate with the beacon 140, the mobile device 150, and the database 130 using the communication network 120.

In operation, the analytics server 110 may request the database 130 to receive and may derive various forms of analytical information from the received data. The database 130 may store data records that are associated with user's interactions with an institution such as a business or any other institution providing services to customers. The database 130 may also record other user information such as sales volume, sales amount, frequency of interactions, customer attributes, and the like. The database 130 may store data records of the interactions with the mobile device 150 when executing a web-application or a service accessed by the customer. The database 130 may be hosted on any number of computing devices comprising a non-transitory machine-readable storage medium capable of storing data records generated, and in some cases received from the analytics server 110, the mobile device 150, or other computing devices (e.g., point-of-sale systems, public websites, or a central database associated with an institution associated with a user interacting with the mobile device 150). The database 130 may further comprise a processor capable of executing various queries and data record management processes, according to instructions from the analytics server 110. One having skill in the art would appreciate that the database 130 may be hosted on a distinct computing device that is in networked-communication with the analytics server 110, the mobile device 150, or a computer system associated with customers.

The analytics server 110 may perform various analytics on data records stored in the database 130 and transmit the results to the beacon 140 or directly to the mobile device 150 to be displayed on the mobile device 150. The analytics server 110 may be any computing device comprising a processor capable of performing the various tasks and processes described herein. Non-limiting examples of the analytics server 110 may include a server, desktop, laptop, tablet, and the like. The analytics server 110 comprises any number of computer-networking components, which facilitate inter-device communications via the communication network 120. One having skill in the art would appreciate that there may be any number of distinct computing devices functioning as the analytics server 110 in a distributed computing environment. The analytics server 110 may communicate data records and instructions to the database 130, where the data records may be stored in the database 130 and where various analytics may be performed on the data by the database 130 in accordance with instructions from the analytics server 110. The analytics server 110 may host an online service, such as cloud-computing application service, an online shopping site, or any other service that provide customer-facing web-based applications that collect customer data through web-based transactions with a computer system associated with customers such as the mobile device 150 over one or more networks such as the communication network 120.

The beacon 140 may be a hardware transmitter and a communication device, which communicates with electronic devices such as the mobile device 150. The beacon 140, in some embodiments, may utilize Bluetooth low energy (BLE) transmission technology to communicate with electronic devices within a pre-determined proximity zone, such as the proximity zone 141. The beacon 140 may broadcast an identifier to nearby portable electronic devices located within the proximity zone 141, such as the mobile device 150. In an embodiment, proximity zone 141 represents the range of transmission of identifier by the beacon 140. For example, the beacon 140 may be instructed (by the analytics server 110) to transmit identifier within a radius of 10 feet. Upon receipt of the identifier from the beacon 140, the mobile device 150 may display a message to the user operating the mobile device 150 and request permission to communicate other information (e.g., user information stored in the mobile device 150 and the like) to the beacon 140. In some embodiments, the beacon 140 may transmit a Universally Unique Identifier (UUID) as an identifier. A UUID is a 128-bit value identifier used in software construction. The beacon 140 may also receive UUID of the mobile device 150 and transmit said UUID to the analytics server 110. The analytics server 110, may then, transmit said UUID and query the database 130 (or another third-party database associated with the customer or the institution) for any information associated with said UUID. For example, the database 130 may transmit personal customer information to the analytics server 110, which match the UUID of the mobile device 150. Additionally, some smartphones can act as beacons. The frequency of sending the signal can also be programmable; for example, a signal can be sent every 100-400 milliseconds. Beacons can also be placed strategically indoors or outdoors to perform many actions.

As used herein, the term "Beacon" applies to any device, mobile or fixed, that is capable of transmitting a data packet. A data packet can be the same as defined in the Bluetooth specification or any other data packet that transmits a unique identifier. Beacon 140 may (repeatedly, continuously, or periodically) transmit data packets in set intervals. The iBeacon system (implemented by Apple®) utilizes iBeacons (a form of beacon) to transmit a data packet consisting mainly of three pieces of information—a Universally Unique Identifier (UUID), a major field, and a minor field. In addition, an iBeacon typically transmits that data packet over and over again. Further information about beacons can be found in the Supplement to the Bluetooth Core Specification, Version 5, which is incorporated by reference herein. In one embodiment, different institutions (e.g., retailers) use these beacons or transmitters as a hyper-local device tracking mechanism (e.g., to locate smartphones within the proximity zone). Non-limiting examples of transmitters include an iBeacon, AltBeacon, and EddyStone, a wireless router, a cellular phone, a tablet, a workstation, or any other suitable computing or other electronic device.

In some embodiments, location-based information may be provided (by the analytics server 110 to beacon 140 and eventually to a clients'/consumers' personal electronic device based on its receipt a packet from a beacon. For example, one or more mobile applications on receiving devices (e.g., mobile device 150) can use the data packet to assess current location or other information. The one or more applications may then transmit information, such as a UUID, contained in the data packet, to the analytics server 110 to retrieve information associated with the data packet (e.g., the analytics server 110 determines that the mobile device is within the proximity zone of the beacon 140). These data packets also allow for delivery of specific content to users based on location. For example, beacon 140 may transmit its UUID to a user's mobile devices. If the user has a smartphone that contains the application associated with the analytics sever 110, the analytics server 110 can transmit special offers (e.g., different media elements as described below) to the user's mobile device either using the beacon or transmitting the data to the application executing on the customer's mobile device. The UUID portion of the data packet may be associated with the institution while the major and minor field may identify specific zone (e.g., geo-fence) within a particular area. As described below, the analytics server may be in direct connection with the user' mobile device through an application installed and executing on the user's mobile device.

Additional information can be gleaned from BLE signals, including an approximate distance between the beacon 140 and the mobile device 150. Furthermore, beacon 140 can be programmed to broadcast its signals at different power levels, known as the "Broadcasting Power." For example, beacon 140 can transmit its Broadcasting Power to the receiving device, which can approximate its distance from the beacon by comparing the Broadcasting Power to the strength of the signal as received, known as the Received Signal Strength Indicator (RSSI).

Even though FIG. 1 only illustrates one beacon 140, in some embodiments, an institution may utilize multiple beacons within an establishment, each beacon with different RSS and UUID data packets. For example, a building may have different beacons in different area in order to geo-fence different areas within the building.

In some embodiments, a receiving device or a mobile device (e.g., a smartphone or any other device configured to communicate with a beacon) can also transmit a data packet, acting as a beacon, which can be received by another receiving device, fixed or mobile. In either case, fixed or mobile, this reception serves to notify the receiver that the mobile transmitter is nearby. As an example, a mobile application could instruct a mobile device to transmit a data packet associated with a network identity, which upon reception at another device, fixed or mobile, could indicate proximity of a user to the network. For example, receiving devices could be placed throughout a building. These receiving devices would monitor the receiving devices' location to track the user. The system of this embodiment could then store the information of which transmitters the user went past, and the user can use an application to retrieve this information. In this way, the system described in FIG. 1 may not need a single beacon 140 to constantly transmit data packets; and depending on the number of transmitters needed, there could be significant cost/complexity savings using this method.

Some embodiments can use RSSI or triangulation to assess more accurately the location of a receiving device. For instance, the receiving device may receive signals from more than one source or of more than one type, e.g., Wi-Fi, BLE, and GPS. By relying on more than once source, these embodiments are more reliable and more accurate. Even though the embodiments disclosed herein describe using beacon technology, it is expressly understood that the location of a user may be determined using any other technology such as Wi-Fi, BLE, and/or GPS. The embodiments disclosed herein are not limited to beacon technology.

In operation, the beacon 140 may be placed in specific areas of indoor space, such as conference rooms, hallways, kitchens, offices, and other areas in a workspace. As described above, an establishment may utilize more than one beacon; in those embodiments, each beacon can be configured such that the location signal range encompasses approximately the boundaries of the area. For example, beacon A associated with room A can have a 3 ft location signal range, beacon B associated with room B can have a 10 ft location signal range, and beacon C associated with room C can have a 20 ft. location signal range. These 3 beacons can be short-range transmission beacons instead of long-range beacons, in order to avoid across-the-wall transmission issues. When the mobile device 150 is within the location signal range of any one of the beacons, then a receiver in the mobile device 150 detects the location signals from beacon 140.

Figure 2:
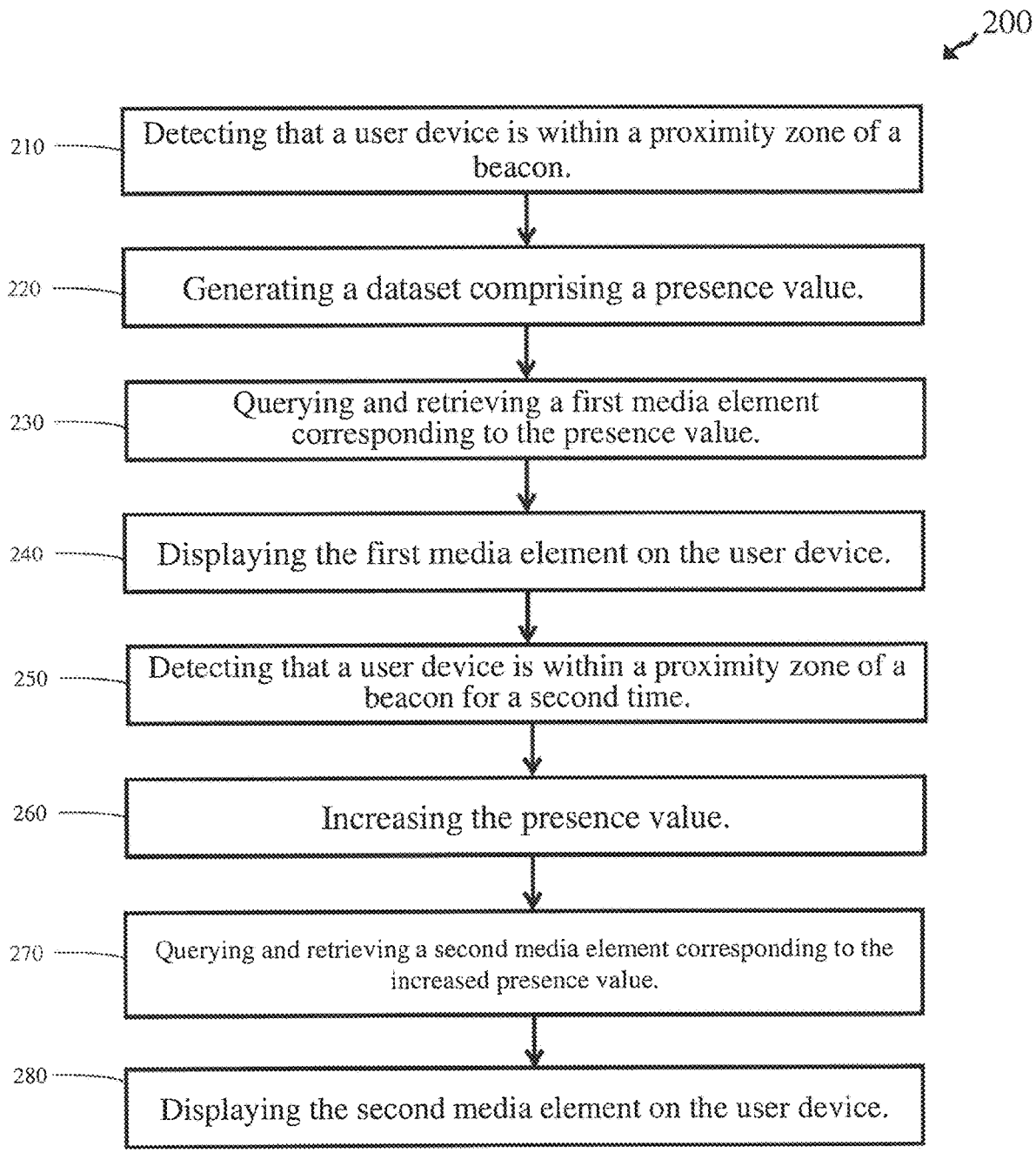
FIG. 2 illustrates a flowchart depicting operational steps of a method for generating an intelligent location-based puzzle, according to an embodiment.

Referring now to FIG. 2, a flowchart depicting operational steps of a method for generating an intelligent and location-based puzzle is illustrated, in accordance with an embodiment. Steps of the method 200 may be implemented using one or more modules of the data analytics server, the client device, and the database service provider. FIG. 2 does not imply any limitations with regard to the environments or embodiments that may be implemented. Modifications to the depicted environment or embodiment shown in FIG. 2 may be made. As mentioned above, even though the embodiments described in FIG. 2 are focused on the beacon technology, the present disclosure is not limited to the beacon technology. For example, in another embodiment, an institution may detect whether a mobile device is within a proximity zone using Wi-FI, BLE, or any other location-tracking technology.

At step 210, the analytics server may detect using a beacon, a user device within a proximity zone of a beacon. The analytics server may receive a first set of data from a beacon. The first set of data may be associated with a user within a pre-determined proximity zone. In some embodiments, the beacon may detect a mobile device within the proximity zone. The beacon may also transmit a unique identifier with a pre-determined frequency within the proximity zone. The mobile device may receive the identifier and communicate back with the beacon in order to establish a connection. In some embodiments, the analytics server may receive the unique beacon identifier from the application executing on the mobile device, and then query a database (configured to store beacon information and their corresponding unique identifiers) using the unique identifier. The analytics server may then retrieve data associated with the beacon. The analytics server may then match the unique identifier received from the application with a beacon and detect a location associated with the mobile device.

Figure 3:
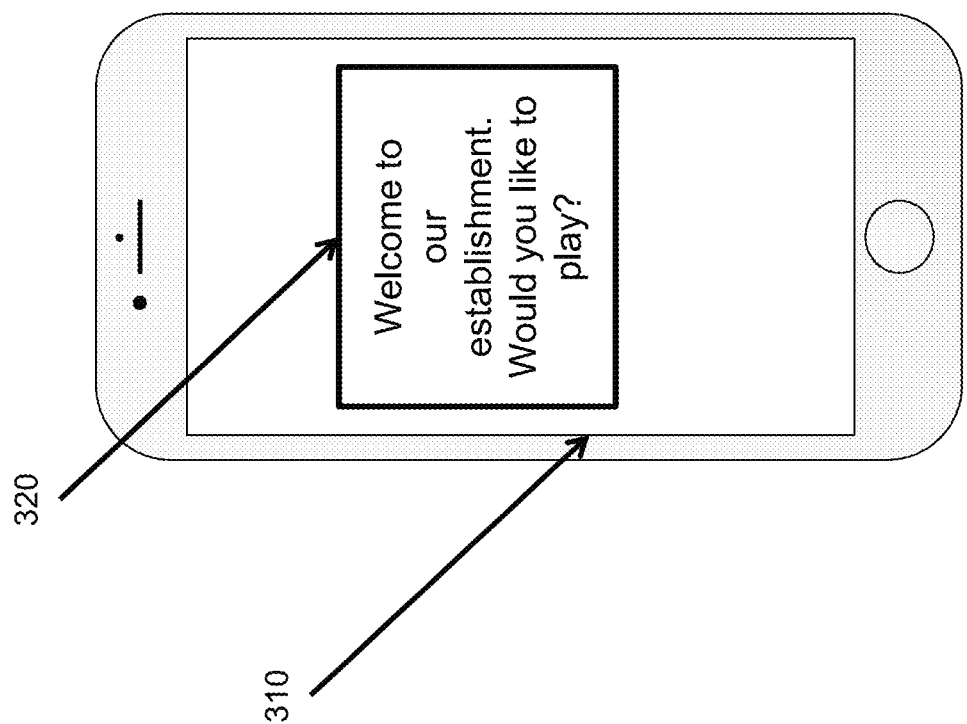
FIG. 3 illustrates an example of a communication of a beacon with a mobile device, according to an embodiment.

FIG. 3 illustrates an example of a communication between the beacon and the mobile device. In this embodiment, mobile device 310 is operated by a user. Upon the mobile device 310 entering the proximity zone of an establishment (e.g., walking near a restaurant or a coffee shop), a beacon associated with the establishment (e.g., the beacon illustrated in FIG. 1 or an application executing on the mobile device 310) transmits a message 320 to be displayed on the mobile device 310. The message 320, requests user's permission to initiate communication with mobile device 310. Upon receiving a positive feedback from the mobile device 310, the beacon, in this embodiment, initiates communication with the mobile device 310 and transmits the gathered information to the analytics server. The analytics server may request identification from the mobile device including user's name and other personal identification, user's connection with the establishment (e.g., purchase history, tenure, purchase power, and the like) stored in the mobile device. For example, the user may have purchased a commodity associated with the establishment or may have an application in direct communication with the analytics server or another computer associated with the establishment installed on the mobile device (e.g., an application related to the establishment, the analytics server, or other establishment APIs). In that embodiment, the analytics server may receive user information and transmit the information to the analytics server. In some embodiments, the analytics server may instruct the beacon (or the application executing on the user's mobile device) to gather specific data. For example, the analytics server may instruct the beacon (or the application executing on the user's mobile device) to transmit a request to the mobile device and request information regarding the user's past purchases, puzzle preferences, and the like.

In some embodiments, an application associated with the analytics server may receive an indication that the user's mobile device has received UUID from a beacon. In those embodiments, the application may automatically transmit the UUID to the analytics server. The Analytics server may then determine a location of the user's mobile device based on the UUID of the beacon. For example, the analytics server may then communicate with the beacon unique to the UUID and determine an exact location of the user. As used herein, all instructions sent to the user's mobile device may be transmitted to the user's mobile device via the application executing on the user's mobile device. For example, as described below, the analytics server may accomplish instructing the user's mobile device to display a media element by instructing the application executing on the user's mobile device to display the media element.

In some embodiments, the analytics server may generate an instruction to query a database (not shown) and inquire about more information. For example, an external database may contain information regarding the user's purchase power, tenure, or other demographic data associated with the user. In another example, the analytics server may inquire user information from a financial institution database associated with the user or another third-party database in association with the institution. The analytics server may use this information to dynamically generate a puzzle for the user or transmit targeted media elements to the user. The analytics server may use the identifier received from the beacon to identify the user, and generate a query to a third-party database.

At step 220, the analytics server may generate a dataset comprising a presence value corresponding to the first set of data. The analytics server may create a dataset comprising user information. The dataset may include all the information received from the beacon (at step 210) and all the information received from the third-party dataset (explained above). The dataset may also include a presence value for the user. The analytics server may define this presence values as a "user's counter," which may simply indicate the number of times that the user's mobile device has been identified within the proximity zone. For example, the counter may identify that a user mobile device has been identified for the first time within the proximity zone. In some embodiments, the dataset may also include other information including customer data received form the application executing on the mobile device or received for the third part. The dataset may be unique to each customer and may include all data gathered regarding the customer (e.g., past purchases, demographic data, game preferences, and the like).

At 230, the analytics server may, upon transmitting a first instruction configured to retrieve a first electronic media element corresponding to the presence value and a first piece of a puzzle, retrieve the first electronic media element from a database. The analytics sever may generate a first instruction configured to receive a first media element, wherein the first media element corresponds to the value within the dataset and represents a first piece of a puzzle. The analytics server may generate an instruction and query the database to receive a first media element. The first media element, in some embodiments, may be a clue to a game, a piece of a puzzle (e.g., a jigsaw puzzle), or a text giving indication of a game (e.g., next steps of a game or what searched for within the context of a game). Non-limiting examples of a game may include a puzzle, crossword, or a Sudoku. For example, a first media element may be a picture, gif, video, or the like. A first media element may also lead the user towards a geographical location or be used in the context of a scavenger hunt game. For example, the first media element may be a picture indicating a pre-determined special geographical location.

The analytics server may use the customer information received form the database to modify the puzzle and the first media element. For example, if the information received form the user indicates that the user operating the mobile device is within the age range of 10-15, the analytics server may generate an instruction for a jigsaw puzzle, which is appropriate for that age range. Continuing with this example, the jigsaw puzzle appropriate for the age range of 10-15 may be different in difficulty level than a jigsaw puzzle for the age-range of 50+. In some embodiments, the analytics server may generate the instruction to receive a puzzle media elements based on user preferences. For example, a user may indicate, using an application in direct communication with the analytics server or previously generating a user profile with the analytics server, an affinity towards crossword puzzles. In that embodiment, the analytics server may generate an instruction to receive a crossword puzzle instead of a Sudoku or a jigsaw puzzle. Many other attributes such as color, font type and size, brightness, and the like may be adjusted and/or modified by the analytics server to the user's liking. The analytics server may transmit the first instruction to the database and, upon this transmission (e.g., querying based on the above-mentioned attributes), receive the first media element.

Figure 4:
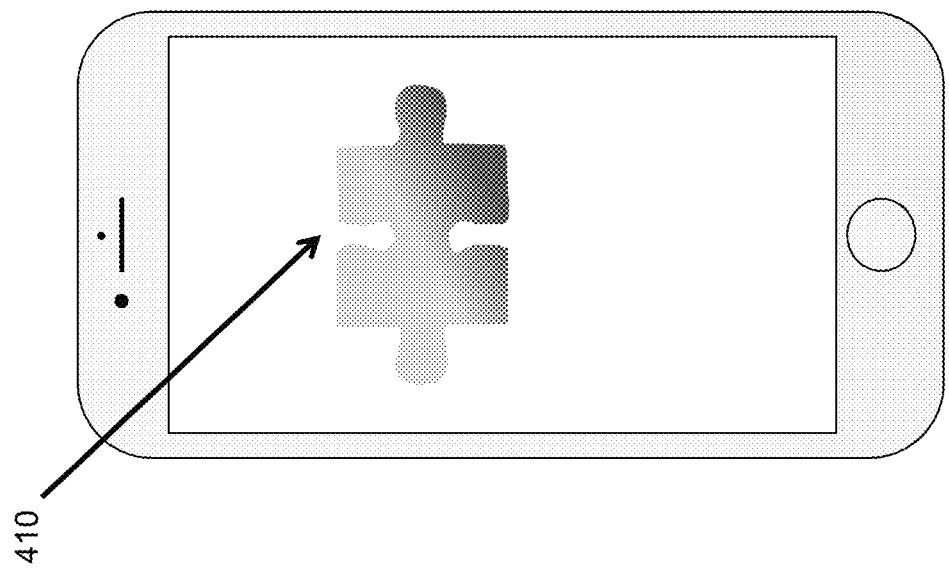
FIG. 4 illustrates an example of a first media element displayed on the mobile device, according to an embodiment.

At 240, the analytics server may generate a second instruction configured to display the first media element on a mobile device associated with the user. The analytics server may generate a second instruction to display the first media element on the mobile device associated with the user. In some embodiments, the analytics server may transmit the second instruction to the beacon, accompanied by another instruction for the beacon to transmit the second instruction to the mobile device (e.g., request the mobile device to display the first media element). In other embodiments, the analytics server may directly communicate with the application executing on the mobile device. The beacon may use Bluetooth technology and communicate the second instruction to the mobile device. In some embodiments, the analytics server may directly communicate with the mobile device through a communication network such as the communication network of FIG. 1 or other similar networks. FIG. 4 illustrates an example of a first media element displayed on the mobile device. In this embodiment, first media element 410 is a first piece of a jigsaw puzzle.

At 250, the analytics server may detect, using the beacon, the user device within the proximity zone of the beacon. The analytics server may receive a second set of data from the beacon, wherein the second set of data is associated with the mobile device of the user within a second pre-determined proximity zone. The beacon may, similar to step 210, detect the mobile device within the second proximity zone and initiate communication with the mobile device by transmitting signals to the mobile device. The beacon device may then transmit user information to the analytics server. In an embodiment, this is caused by the user walking near (e.g., within the second proximity zone) of the establishment. In some embodiments, the analytics server may transmit a request to the beacon to increase or decrease the second proximity zone. For example, the first proximity zone may have a radius of 10 feet and the analytics server may expand the proximity zone (e.g., upon a receiving a request from a client computing device) to 15 feet.

At 260, the analytics server may increase the presence value within the dataset. The analytics server may update the presence value within the dataset created for the user (step 220). As stated above, the value may be used as a counter to identify the number of times that the user, operating the mobile device, has been within the proximity zone. If the user returns to the establishment for the second time, the value within the dataset generated for the user may be adjusted to 2. The analytics server may also, similar to step 220, request another instruction to a third-party database to receive information regarding the user. For example, if a pre-determined time has passed between the first and the second time of identification of the mobile device, the analytics server may update the user information within the database or query whether any user information/preferences has changed.

At 270, the analytics server may, upon transmitting a third instruction to retrieve a second electronic media element corresponding to the increased presence value within the dataset and a second piece of the puzzle, retrieve the second electronic media element from the database. The analytics server may generate a third instruction configured to receive a second media element, wherein the second media element corresponds to the adjusted value within the dataset and represents a second piece of the puzzle. The analytics server may generate a third instruction to receive a second media element (such as another clue to the game). The second media element, in some embodiments, may correspond to the adjusted value within the user's dataset generated in step 220. The analytics server may query the database for another media element, which corresponds to attributes of the game and the first media element. Upon transmitting that instruction to the database, the analytics server may receive a second media element. The second media element, in some embodiment, may be another clue consistent with the game of the first media element.

In some embodiments, the analytics server may generate the third instruction for the second media element based on a response received upon presentation of the first media element. For example, if the first media element relates to a crossword puzzle, the analytics server, upon instructing the mobile device to display the first media element, may receive a response associated with the first media element (e.g., the crossword puzzle). The analytics server may determine whether the response to the first media element is acceptable. In some embodiments, the response received is compared to an acceptable response. The acceptable response may be queried and received, upon instructions by the analytics server, from the database. If the response is acceptable, the analytics server may, when generating the third instruction, choose a next option in accordance with the respective puzzle rules. For example, if the response to the first media element of a crossword puzzle is correct and acceptable, the analytics server may display another media element, which corresponds to another question within the same crossword puzzle. If the response to the first media element is incorrect, the analytics server may continue displaying the same media element until the correct response is received.

In another example, in a scavenger hunt game of, the first media element may direct the user towards a specific geographical location, once the user has reached said location, the user is given a code or an identifier indicating the completion of the first step. Upon receiving the code from the mobile device, the analytics server may determine whether the code entered matches a pre-determined value; if the received code is acceptable (e.g., matches the pre-determined value), the analytics server may create a second value corresponding to the acceptable response to the first media element. When the user is identified within the proximity zone for the second time, the analytics server may retrieve the second value, identify that the user's response to the first media element was acceptable, and generate the instruction to receive a second media element (e.g., as a next level/step to the first media element). In some embodiments, consecutive completion of the clues may be a pre-requisite for achieving the next clue.

In some embodiments, the analytics server may also generate the instruction to receive a second media element, which is not related to the first media element. For example, if a user is not satisfied with the first media element or the presented puzzle at step 240, the analytics server may receive an input from the user to change the puzzle. The analytics server may generate the third instruction for a second media element, which is consistent with the received user input. For example, the analytics server may provide a jigsaw puzzle to the mobile device and receive input from the mobile device, which indicates a negative response towards jigsaw puzzles. The analytics server may then generate the third instruction to receive a crossword puzzle as the second media element and change the user's game.

Figure 5:
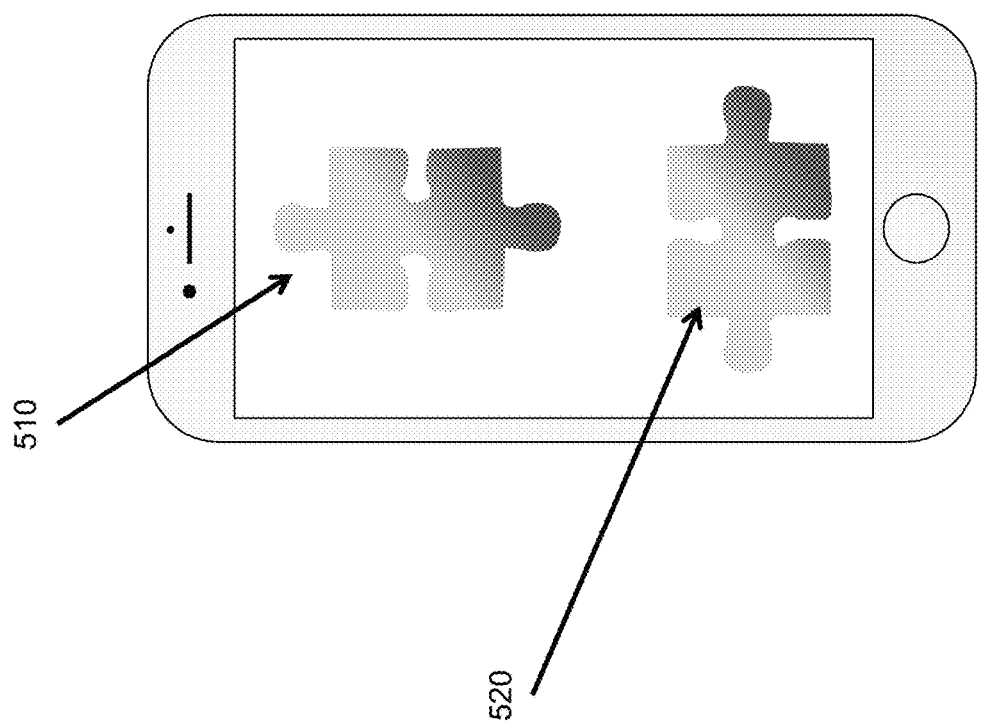
FIG. 5 illustrated an example of a second media element displayed on the mobile device, according to an embodiment.

At 280, the analytics server may transmit a fourth instruction to the application executing on the user device to display the second electronic media element. The analytics server may generate a fourth instruction configured to display the second media element on the mobile device associated with the user. As explained above (step 240), the analytics server may generate an instruction to the beacon to transmit the second media element to the mobile device. Consistent with step 240, the analytics server may instruct the beacon to instruct the mobile device to display the second clue or directly communicate with the mobile device to transmit the instruction. FIG. 5 illustrates an example of a second media element. In this example, the second media element 510 is another piece of the jigsaw puzzle presented to the mobile device in step 240. The mobile device is instructed to display media element 510 and in some embodiments, media element 520 (e.g., the first media element or media element 410) is also displayed.

The analytics server may iteratively repeat steps 240-280 as many times as the mobile device is identified with the first or the second proximity zones. The analytics server may also upon the completion of the puzzle, generate another instruction to receive a media element associated with a different puzzle/game. The analytics server, may also transmit an instruction to the beacon, or otherwise cause the mobile device, to display a promotional media element. In some embodiments, the promotional media element is associated with the establishment. The analytics server may provide the mobile device with the media element upon the value within the dataset satisfying a pre-determined threshold.

In some embodiments, the analytics server may transmit a media element to the mobile device, accompanied by an instruction to display said media element. The analytics server may determine whether the value within the dataset satisfies a threshold. Upon the value satisfying the threshold, the analytics server may transmit the media element to the mobile device. For example, if the user has been to the establishment more than 10 times, the analytics server may transmit an electronic file containing a coupon associated with the establishment to the mobile device. The analytics' server may, as explained above, modify the media element based on user preferences and/or user attributes. For example, if the received data indicates a male user within the age range of 10-15, the analytics server may choose a coupon appropriate for the user's age.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
    periodically monitoring, by a server, location of an electronic device using unique beacon identifiers received via the electronic device;
    displaying, by the server on the electronic device, a request to interact with at least one media element from a set of media elements, wherein each media element is representative of a position in a two-dimensional game;
    when the server detects the electronic device within a first proximity zone for a first time, transmitting, by the server to the electronic device, a first media element of the set of media elements; and
    when the server detects the electronic device within a second proximity zone for a second time, transmitting, by the server to the electronic device, a second media element from the set of media elements,
    whereby a user operating the electronic device interacts with the first media element and the second media element to respond to the request, wherein the first media element and the second media element represent non-consecutive positions in the two dimensional game.

2. The method of claim 1, further comprising:
    receiving, by the server from the electronic device, an input in response to displaying the first media element.

3. The method of claim 1, wherein an interaction with the first media element is a pre-requisite for displaying the second media element.

4. The method of claim 1, wherein at least one of the first media element and the second media element corresponds to a user preference.

5. The method of claim 1, wherein attributes of at least one of the first proximity zone and the second proximity zone is received, by the server, from the electronic device.

6. The method of claim 1, wherein the two-dimensional game corresponds to at least one of a puzzle, crossword puzzle, Sudoku, and a scavenger hunt game.

7. The method of claim 1, wherein the server transmits a promotional media element corresponding to a number of times that the electronic device is located within the first or the second proximity zone.

8. The method of claim 7, wherein the promotional media element corresponds to attributes of a user operating the electronic device.

9. The method of claim 1, wherein the first or the second proximity zone for the first proximity zone and the second proximity zone are the same distance from a predetermined location.

10. A computer system comprising:
one or more beacon devices configured to communicate with an electronic device, wherein the electronic device is configured to capture location data from the one or more beacon devices and transmit the location data to a server,
wherein the server is in communication with the electronic device, the server configured to:
periodically monitor location of an electronic device using unique beacon identifiers received via the electronic device;
display, on the electronic device, a request to interact with at least one media element from a set of media elements, wherein each media element is representative of a position in a two-dimensional game;
when the server detects the electronic device within a first proximity zone for a first time, transmit, to the electronic device, a first media element of the set of media elements; and
when the server detects the electronic device within a second proximity zone for a second time, transmit, to the electronic device, a second media element from the set of media elements,
whereby a user operating the electronic device interacts with the first media element and the second media element to respond to the request, wherein the first media element and the second media element represent non-consecutive positions in the two dimensional game.

11. The computer system of claim 10, wherein the server is further configured to:
receive, from the electronic device, an input in response to displaying the first media element.

12. The computer system of claim 10, wherein an interaction with the first media element is a pre-requisite for displaying the second media element.

13. The computer system of claim 10, wherein at least one of the first media element and the second media element corresponds to a user preference.

14. The computer system of claim 10, wherein attributes of at least one of the first proximity zone and the second proximity zone is received, by the server, from the electronic device.

15. The computer system of claim 10, wherein the two-dimensional game corresponds to at least one of a puzzle, crossword puzzle, Sudoku, and a scavenger hunt game.

16. The computer system of claim 10, wherein the server transmits a promotional media element corresponding to a number of times that the electronic device is located within the first or the second proximity zone.

17. The computer system of claim 16, wherein the promotional media element corresponds to attributes of a user operating the electronic device.

18. The computer system of claim 10, wherein the first or the second proximity zone for the first proximity zone and the second proximity zone are the same distance from a predetermined location.

* * * * *